United States Patent
Yang et al.

(10) Patent No.: US 10,252,369 B2
(45) Date of Patent: Apr. 9, 2019

(54) COOLING TO CONTROL THERMAL STRESS AND SOLIDIFICATION FOR WELDING OF DISSIMILAR MATERIALS

(71) Applicant: GM GLOBAL TECHNOLOGY OPERATIONS LLC, Detroit, MI (US)

(72) Inventors: David Yang, Shanghai (CN); Blair E. Carlson, Ann Arbor, MI (US); David R. Sigler, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 700 days.

(21) Appl. No.: 14/792,656

(22) Filed: Jul. 7, 2015

(65) Prior Publication Data
US 2017/0008118 A1   Jan. 12, 2017

(51) Int. Cl.
*B23K 11/00*   (2006.01)
*B23K 11/11*   (2006.01)
(Continued)

(52) U.S. Cl.
CPC .............. *B23K 11/115* (2013.01); *B23K 11/20* (2013.01); *B23K 37/003* (2013.01); *B23K 2103/20* (2018.08)

(58) Field of Classification Search
CPC ....... B23K 11/20; B23K 11/185; B23K 11/24; B23K 11/241; B23K 11/257;
(Continued)

(56) References Cited

U.S. PATENT DOCUMENTS

| 4,072,843 A | * | 2/1978 | Szabo | B23K 11/163 |
|---|---|---|---|---|
| | | | | 219/91.1 |
| 4,675,494 A | * | 6/1987 | Dilay | B23K 11/252 |
| | | | | 219/110 |

(Continued)

FOREIGN PATENT DOCUMENTS

| CN | 103990901 A | 8/2014 |
|---|---|---|
| CN | 104668756 A | 6/2015 |
| JP | 11342477 | 12/1999 |

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — Dana Ross
*Assistant Examiner* — Ayub Maye
(74) *Attorney, Agent, or Firm* — Reising Ethington P.C.

(57) ABSTRACT

A workpiece stack-up that includes at least a steel workpiece and an aluminum-based workpiece can be resistance spot welded by a spot welding method in which the welding current is controlled to perform one or more stages of weld joint development. When it is desired to terminate weld current flow and to solidify a liquid weld pool into a weld nugget (of mostly aluminum-based composition), additional cooling is applied to the outer surface of the aluminum-based workpiece around the contact area of the spot welding electrode engaging the surface of the aluminum-based workpiece surface. The additional cooling is applied and controlled so as to increase the rate of solidification of the liquid aluminum-based material and to control the direction of solidification of the weld nugget to better confine impurities, and the like, originally in the melt, at the surface of the steel workpiece.

18 Claims, 4 Drawing Sheets

(51) Int. Cl.
  *B23K 11/20* (2006.01)
  *B23K 37/00* (2006.01)
  *B23K 103/20* (2006.01)

(58) Field of Classification Search
  CPC ............ B23K 2203/04; B23K 2203/05; B23K 2203/10; B23K 2203/20
  USPC .......... 219/86.1, 91.1, 91.2, 91.23, 110, 108, 219/111, 78.01
  See application file for complete search history.

(56) References Cited

U.S. PATENT DOCUMENTS

| | | | | |
|---|---|---|---|---|
| 4,678,887 | A * | 7/1987 | Nagel | B23K 11/252 219/110 |
| 4,734,555 | A * | 3/1988 | Ferguson | B23K 11/253 219/109 |
| 4,835,356 | A * | 5/1989 | Abe | B23K 11/11 219/119 |
| 4,973,814 | A * | 11/1990 | Kojima | B23K 11/252 219/108 |
| 5,349,153 | A * | 9/1994 | Prucher | B23K 11/3009 219/117.1 |
| 5,406,045 | A * | 4/1995 | Kiriishi | B23K 11/257 219/110 |
| 5,483,035 | A * | 1/1996 | Kawai | B23K 11/253 219/110 |
| 6,046,424 | A * | 4/2000 | Jochi | B23K 11/257 219/110 |
| 6,320,774 | B2 * | 11/2001 | Jochi | B23K 11/257 219/130.51 |
| 6,861,609 | B2 * | 3/2005 | Sigler | B23K 11/3009 219/117.1 |
| 7,850,059 | B2 | 12/2010 | Kobayashi et al. | |
| 7,935,908 | B2 | 5/2011 | Nakagawa et al. | |
| 7,984,840 | B2 | 7/2011 | Kobayashi et al. | |
| 8,020,749 | B2 | 9/2011 | Kobayashi et al. | |
| 8,058,584 | B2 | 11/2011 | Miyamoto et al. | |
| 8,487,206 | B2 | 7/2013 | Urushihara et al. | |
| 8,502,105 | B2 * | 8/2013 | Tanaka | B23K 11/115 219/86.22 |
| 2001/0027962 | A1 * | 10/2001 | Moro | B23K 3/033 219/85.22 |
| 2005/0224562 | A1 * | 10/2005 | Prevey | B23K 9/00 228/233.1 |
| 2007/0212565 | A1 * | 9/2007 | Urushihara | B23K 11/20 428/577 |
| 2013/0189023 | A1 | 7/2013 | Spinella | |
| 2014/0144893 | A1 * | 5/2014 | Yang | B23K 9/0026 219/121.64 |
| 2014/0231396 | A1 | 8/2014 | Yang et al. | |
| 2014/0305912 | A1 * | 10/2014 | Taniguchi | B23K 11/24 219/91.22 |
| 2014/0360986 | A1 | 12/2014 | Sigler et al. | |
| 2015/0053654 | A1 | 2/2015 | Sigler et al. | |
| 2015/0053655 | A1 | 2/2015 | Sigler et al. | |
| 2015/0083693 | A1 | 3/2015 | Schroth et al. | |
| 2015/0096961 | A1 | 4/2015 | Carlson et al. | |
| 2015/0096962 | A1 | 4/2015 | Sigler et al. | |
| 2015/0231729 | A1 | 8/2015 | Yang et al. | |
| 2015/0231730 | A1 | 8/2015 | Yang et al. | |
| 2015/0352658 | A1 | 12/2015 | Yang et al. | |
| 2015/0352659 | A1 | 12/2015 | Sigler et al. | |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.

Wang et al., U.S. Appl. No. 14/561,746 entitled "Resistance Spot Welding Steel and Aluminum Workpieces with Electrode Insert," filed Dec. 5, 2014.

Sigler et al., U.S. Appl. No. 14/673,106, entitled "Conical Shaped Current Flow to Facilitate Dissimilar Metal Spot Welding," filed Mar. 30, 2015.

Sigler et al., U.S. Appl. No. 14/722,563 entitled "Resistance Spot Welding Workpiece Stack-Ups of Different Combinations Steel Workpieces and Aluminum Workpieces," filed May 27, 2015.

Sigler et al., U.S. Appl. No. 14/883,249 entitled "Multi-State Resistance Spot Welding Method for Workpiece Stack-Up Having Adjacent Steel and Aluminum Workpieces," filed Oct. 14, 2015.

Yang et al., U.S. Appl. No. 14/962,866 entitled "Welding Electrode for Use in Resistance Spot Welding Workpiece Stack-Ups that Include an Aluminum Workpiece and a Steel Workpiece," filed Dec. 8, 2015.

Sigler et al., U.S. Appl. No. 15/097,821 entitled "Resistance Spot Welding Steel and Aluminum Workpieces with Electrode Having Insert," filed Apr. 13, 2016.

Sigler et al., U.S. Appl. No. 15/137,778 entitled "External Heat Assisted Welding of Dissimilar Metal Workpieces," filed Apr. 25, 2016.

* cited by examiner

COOLING TO CONTROL THERMAL STRESS AND SOLIDIFICATION FOR WELDING OF DISSIMILAR MATERIALS

TECHNICAL FIELD

This disclosure pertains to the directed cooling at an outside surface of an aluminum-based workpiece at a resistance spot weld site to control solidification of underlying liquid aluminum alloy spot weld material. Such cooling is useful during resistance spot welding of a stack-up of an aluminum-based workpiece and a steel alloy workpiece, assembled with faying surfaces of the workpieces overlapping with a faying surface interface where the weld nugget is formed.

BACKGROUND OF THE INVENTION

Resistance spot welding is a process used by a number of industries to join together two or more metal workpieces. The automotive industry, for example, often uses resistance spot welding to join together pre-fabricated metal workpieces during the manufacture of a vehicle door, hood, trunk lid, or lift gate, among others. A number of spot welds are typically formed along a peripheral edge of the metal workpieces or some other bonding region to ensure the part is structurally sound. While spot welding has typically been practiced to join together certain similarly-composed metal workpieces—such as steel alloy-to-steel alloy and aluminum alloy-to-aluminum alloy—the desire to incorporate lighter weight materials into a vehicle body structure has generated interest in joining steel workpieces to aluminum-based (aluminum or aluminum alloy) workpieces by resistance spot welding. In particular, the ability to resistance spot weld workpiece stack-ups containing different workpiece combinations (e.g., steel/steel, aluminum-based/steel, and aluminum-based/aluminum-based) with one piece of equipment would promote production flexibility and reduce manufacturing costs.

Resistance spot welding, in general, relies on the resistance to the flow of an electrical current through overlapping metal workpieces and across their faying interface to generate heat. To carry out such a welding process, a pair of opposed spot welding electrodes are typically clamped at diametrically aligned spots on opposite sides of the workpieces at a predetermined weld site. An electrical current is then passed through the metal workpieces from one electrode to the other. Resistance to the flow of this electrical current generates heat within the metal workpieces and at their faying interface. When a steel workpiece and an aluminum-based workpiece are being spot welded, the heat generated at their faying interface initiates a molten weld pool extending into the aluminum-based workpiece from the faying interface. This molten weld pool wets the adjacent surface of the steel workpiece and, upon cessation of the current flow, solidifies into a weld nugget that forms all or part of a weld joint.

In practice, however, spot welding a steel workpiece to an aluminum-based workpiece is challenging since a number of characteristics of those two metals can adversely affect the strength—most notably the peel strength—of the weld joint. For one challenge, the aluminum-based workpiece usually contains one or more refractory oxide layers present on its faying surface. The oxide layer(s) are typically composed of aluminum oxides, although other oxide compounds may also be present. For example, in the case of magnesium-containing aluminum alloys, the oxide layer(s) also typically include magnesium oxides. The oxide layer(s) present on the surface of the aluminum-based workpiece are electrically insulating and mechanically tough. As a result of these physical properties, the oxide layer(s) have a tendency to remain intact at the faying interface where they can hinder the ability of the molten weld pool to wet the steel workpiece and also provide a source of near-interface defects within the growing weld pool. The insulating nature of the surface oxide layer(s) also raises the electrical contact resistance of the aluminum alloy workpiece—namely, at its faying surface and at its electrode contact point—making it difficult to effectively control and concentrate heat within the aluminum alloy workpiece. Efforts have been made in the past to remove the oxide layer(s) from the aluminum-based workpiece prior to spot welding. Such removal practices can be unpractical, though, since the oxide layer(s) have the ability to self-heal or regenerate in the presence of oxygen, especially with the application of heat from spot welding operations.

The steel workpiece and the aluminum-based workpiece also possess different properties that tend to complicate the spot welding process. Specifically, steel has a relatively high melting point (~1500° C.) and relatively high electrical and thermal resistivities, while the aluminum-based material has a relatively low melting point (~600° C.) and relatively low electrical and thermal resistivities. As a result of these physical differences, most of the heat is generated in the steel workpiece during current flow. This heat imbalance sets up a temperature gradient between the steel workpiece (higher temperature) and the aluminum-based workpiece (lower temperature) that initiates rapid melting of the aluminum-based workpiece. The combination of the temperature gradient created during current flow and the high thermal conductivity of the aluminum-based workpiece means that, immediately after the electrical current ceases, a situation occurs where heat is not disseminated symmetrically from the weld site. Instead, heat is conducted from the hotter steel workpiece through the aluminum-based workpiece towards the welding electrode in contact with the aluminum-based workpiece, which creates a steep thermal gradient between the steel workpiece and the welding electrode.

The development of a sustained steep thermal gradient between the steel workpiece and the welding electrode in contact with the aluminum-based workpiece is believed to weaken the integrity of the resultant weld joint in two primary ways. First, because the steel workpiece retains heat for a longer duration than the aluminum-based workpiece after the electrical current has ceased, the molten weld pool solidifies directionally, starting from the region nearest the colder welding electrode (often water cooled) associated with the aluminum-based workpiece and propagating towards the faying interface. A solidification front of this kind tends to sweep or drive defects—such as gas porosity, shrinkage voids, and surface oxide residue—towards and along the full width or diameter of the faying interface within the weld nugget. Second, the sustained elevated temperature in the steel workpiece promotes the growth of brittle Fe—Al intermetallic compounds at and along the faying interface. The intermetallic compounds tend to form thin reaction layers between the weld nugget and the steel workpiece. These intermetallic layers are generally considered part of the weld joint, if present, in addition to the weld nugget. Having a dispersion of weld nugget defects together with excessive growth of Fe—Al intermetallic compounds along the faying interface tends to reduce the peel strength of the final weld joint.

In light of the aforementioned challenges, previous efforts to spot weld a steel workpiece and an aluminum-based workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical processes such as self-piercing rivets and flow-drill screws have predominantly been used instead. Both self-piercing rivets and flow-drill screws are considerably slower and have high consumable costs as compared to spot welding. They also add weight to the vehicle body structure which at some point can begin to counteract the weight savings attained through the use of aluminum-based workpieces in the first place. Advancements in spot welding that would make the process more capable of joining steel and aluminum-based workpieces would thus be a welcome addition to the art.

SUMMARY OF THE INVENTION

This disclosure pertains to the formation of an improved quality resistance spot weld between faying surfaces of an aluminum-based alloy workpiece and a steel-alloy workpiece. In many manufacturing applications a series of such spot welds will be formed between a stack-up in which one surface of an aluminum alloy sheet lies against a facing surface of a steel alloy sheet to form an interface at the faying surfaces of the workpieces. Two opposing resistance welding electrodes, aligned on a common electrode axis, are pressed against opposite sides of the stacked workpieces at a selected spot weld site. As the electrodes are pressed against the outer surfaces of the stacked workpieces a programmed welding current is briefly passed between the electrodes, through the workpieces at the spot welt site. The welding current is suitably programmed to produce a molten weld pool, located mainly in the aluminum alloy workpiece and of aluminum alloy composition, and which lies against and wets the faying surface of the steel workpiece.

In previous welding practices the welding current would be stopped and the weld site allowed to cool in ambient air while the applied force of the welding electrodes is maintained against the outer surfaces of the stacked workpieces. Often one or both of the copper welding electrodes are water cooled and they serve to accelerate the removal of heat from the spot weld site and the solidification of the molten weld pool. In accordance with practices of this invention, physical cooling means is provided for significant additional cooling through the outer surface of the aluminum alloy workpiece. The added physical cooling system is focused on the surface area immediately surrounding the spot where the welding tip of the resistance welding electrode is pressed against the aluminum workpiece surface. For example, an array of supported cooling tubes, positioned in a ring (or in two engaging semi-circular rings) around the spot welding electrode and directed at the aluminum workpiece surface, may be used to deliver an enveloping stream of gas such as air or nitrogen (or the like cooling gas or fluid) at either ambient temperature or reduced temperature against the outer aluminum surface around the region still contacted by the electrode. Or a ring-shaped, internally-cooled member, having a suitable heat transfer contact surface, may be placed against the outer aluminum workpiece surface immediately surrounding the welding electrode.

The increased rate of heat transfer from the spot weld site of the hot aluminum workpiece surface is managed to change the rate and direction of solidification of the molten weld pool in forming the weld nugget which previously has largely extended into the aluminum alloy workpiece from its faying surface with the steel workpiece. In accordance with this invention such directional external cooling of the outer aluminum workpiece surface is conducted and controlled so the solidifying weld nugget forms from the perimeter of the molten weld pool within the aluminum workpiece towards its center so as to reduce the amount, shape, and location of aluminum oxide materials (and the like) at the surface of the steel workpiece, to improve the cleanliness and strength (especially the peel strength) of the bond of the weld nugget at the faying interface of the workpieces at the spot weld site, and to reduce residual thermal stress around the weld site.

Other details and advantages of the present resistance spot welding process for joining aluminum alloy and steel alloy workpieces will be apparent from a description of preferred embodiments of the invention which follows in this specification.

DESCRIPTION OF PREFERRED EMBODIMENTS

Figure 1:
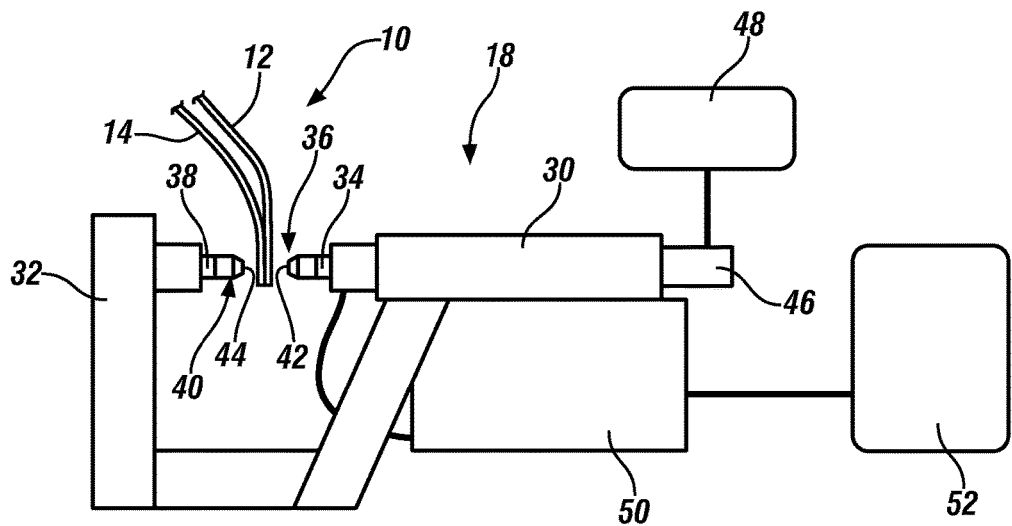
FIG. 1 is a schematic side elevation view of a workpiece stack-up, which includes a steel workpiece and an aluminum-based workpiece, situated between opposed spot welding electrodes of a weld gun in preparation for spot welding.

Spot-welding a steel workpiece and an aluminum-based workpiece (aluminum or aluminum alloys) presents some notable challenges, as discussed above. The surface oxide layer(s) present on the aluminum-based workpiece are difficult to breakdown and disintegrate, which, during traditional spot welding techniques, leads to weld defects at the faying interface in the form of micro-cracks and other disparities caused by residual oxides. Moreover, the steel workpiece is more thermally and electrically resistive than the aluminum-based workpiece, meaning that the steel workpiece is more rapidly heated and acts as a heat source while the aluminum-based workpiece acts as a heat conductor. The resultant thermal gradient established between the workpieces during and just after electrical current flow has a tendency to drive gas porosity and other disparities in the molten weld pool, including the residual oxide defects, towards and widely along the faying interface, and also contributes to the formation and growth of brittle Fe—Al intermetallic compounds at the faying interface in the form of one or more thin reaction layers on the steel workpiece.

A spot welding method, with supplemental cooling of the outer surface of the aluminum workpiece at the completion of weld current flow, has been devised that counterbalances these challenges and improves the ability to successfully and repeatedly spot weld steel and aluminum-based workpieces together. It has been found that a stronger, better shaped weld nugget, largely located in the aluminum alloy workpiece, with stronger adherence to the steel workpiece, and with a more favorable confined distribution of impurities and pores in the center of the weld nugget, may be formed by providing supplemental cooling to the outer surface of the aluminum workpiece in the area surrounding the spot welding electrode at that location. The cooling is started in the final milliseconds of weld current flow through the welding electrodes and workpieces, or just as the weld current is stopped, or immediately following the termination of the weld current. Of course, some cooling of the spot weld site is obtained from the ambient air, and more cooling may be obtained by the use of water cooled welding electrodes as they remained pressed against the outer faces of the workpieces after the welding current flow is stopped. But additional and enhanced cooling at and through the outer aluminum workpiece surface reduces thermal stress at the weld site and favorably changes the progress of formation of the weld nugget.

The cooling of the aluminum workpiece may be accomplished by delivering cooling air (or other suitable gas) at ambient or reduced temperature in a circular pattern, or like enclosed pattern, around the spot welding electrode to flow against and deflect from the outer surface of the aluminum alloy workpiece. The cooling air may be delivered at a temperature and flow rate determined to provide suitable cooling of the aluminum workpiece that is complementary to any cooling provided by a water-cooled weld electrode after current flow has been stopped. For example, air chilled below ambient temperatures may be delivered to the weld site at a temperature in the range of 15° C. to about 0° C.

In one illustrative embodiment, cooling air may be directed through a group of delivery tubes supported in a grouping of the tubes generally surrounding the spot welding electrode. The flow of cooling air in the circular pattern cools the upper surface of the aluminum alloy in a surface region immediately surrounding the spot weld location as defined by the contacting surface of the spot welding electrode. Any suitable manifold-like cooling air delivery device may be placed, for example, around the spot welding electrode to direct the flow of cooling fluid around the perimeter of the weld site. Of course, other cooling heat transfer fixtures may be placed in a like position against the surface of the aluminum-based workpiece and surrounding the weld site. Such heat transfer fixtures will be operated at a predetermined temperature range and provide suitable heat transfer surface to improve the quality of the weld nugget and its interface with the steel workpiece. These cooling practices are described in more detail below in this specification with reference to FIGS. 5, 6A, and 6B.

Such cooling of the aluminum workpiece surface, particularly in the area surrounding the molten aluminum weld nugget, is conducted to quickly cool the higher thermal conductivity workpiece and to reduce the high thermal stress in that workpiece. The enhanced cooling is also planned and executed to rapidly drive the solidification of the molten weld pool radially inwardly in the aluminum workpiece to the center of the solidified weld nugget so as to concentrate impurities and imperfections at the center of the weld nugget and to increase the interfacial imperfection-free area of the weld nugget at the surface of the steel workpieces. Resistance spot welds with weld button pullout and high strength have been demonstrated in spot welds of 1.2 mm thick aluminum alloy sheet to 1.0 mm thick steel sheet and in welds of 2.0 mm thick aluminum alloy sheet to 1.0 mm thick steel sheet.

The spot welding method with the supplemental cooling of the surface of the aluminum workpiece at the spot weld site may be beneficially used in combination with most weld-current flow practices and electrode contacting practices for forming resistance spot welds between aluminum-based alloy workpieces and steel alloy workpieces. However, it is also to be understood and appreciated that the subject cooling of the outer surface of the aluminum-based workpiece may be used in combination with recent improvements in welding practices likewise assigned to the assignee of this invention. For example, the supplemental cooling practice of this specification may be used in combination with the following multi-stage welding method for forming spot welds in stacked aluminum-based alloy workpieces and steel alloy workpieces.

The multi-stage spot welding method invokes control of the electrical current passed between opposed welding electrodes and through the steel and aluminum-based workpieces in order to carry out multiple stages of weld joint development. The multiple stages include: (1) a molten weld pool growth stage in which a molten weld pool is initiated and grown within the aluminum-based workpiece; (2) a molten weld pool solidification stage in which the molten weld pool is allowed to cool and solidify into a weld nugget that forms all or part of a weld joint (the weld joint may also include intermetallic compound layers); (3) a weld nugget re-melting stage in which at least a portion of the weld nugget is re-melted; (4) a re-melted weld nugget solidification stage in which the re-melted portion of the weld nugget is allowed to cool and solidify; and optionally (5) a metal expulsion stage in which at least part of the re-melted portion of the weld nugget is expelled along the faying interface of the workpieces. The several stages of the disclosed method, in particular the weld nugget re-melting stage (stage 3), function to diminish the adverse effects of, and at least partially eradicate, the weld defects in the weld nugget that are believed to weaken the weld joint. The multi-stage spot welding method thus enhances the strength, especially the peel strength, of the ultimately-formed weld joint that gets put into service. And the subject supplemental cooling process may be used in combination with such a multi-stage spot welding method. It could be used, for example, during the above-described stage 4 when the re-melted weld nugget is being cooled and re-solidified.

Figure 2:
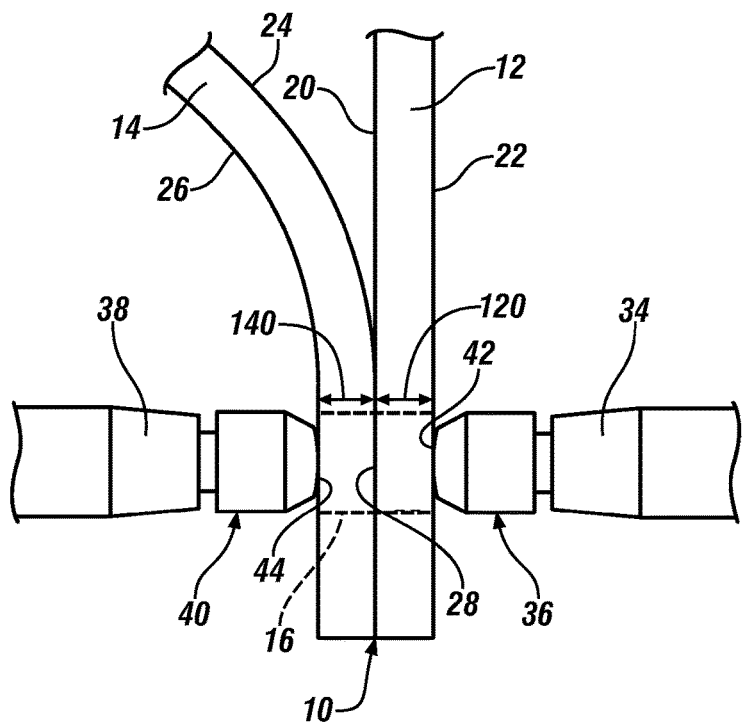
FIG. 2 is a partial, magnified view of the workpiece stack-up and the opposed welding electrodes depicted in FIG. 1.

FIGS. 1 and 2 illustrate an exemplary embodiment of a set-up of welding equipment and workpieces preparatory to the supplemental cooling of the aluminum-based workpiece following a multi-stage spot welding method. Such a resistance spot welding practice may be performed on a workpiece stack-up 10 by a weld gun 18 that is mechanically and electrically configured to execute spot welding practices in accordance with a programmed weld schedule. The workpiece stack-up 10 includes at least a steel workpiece 12 and an aluminum-based workpiece 14. As shown here in FIGS. 1-2, for example, the workpiece stack-up 10 may include only the steel and aluminum-based workpieces 10, 12. Of course, other metal workpieces may also be included in the stack-up 10, despite not being shown here, such as an additional steel workpiece or an additional aluminum-based workpiece. The term "workpiece" and its steel and aluminum-based variations is used broadly in the present disclosure to refer to a sheet metal layer, a casting, an extrusion, or any other piece that is resistance spot weldable, inclusive of any surface layers or coatings, if present.

The steel workpiece 12 may be coated or uncoated steel. Such workpieces include galvanized (zinc-coated) low carbon steel, low carbon bare steel, galvanized advanced high strength steel (AHSS), and hot-stamped boron steel. Some specific types of steels that may be used in the steel workpiece 12 are interstitial-free (IF) steel, dual-phase (DP) steel, transformation-induced plasticity (TRIP) steel, high-strength low alloy (HSLA) steel, and press-hardened steel (PHS). Regarding the aluminum-based workpiece 14, it may coated or uncoated aluminum or aluminum alloy. Aluminum alloys contain 85 wt. % or more aluminum—such as 5XXX, 6XXX, and 7XXX series aluminum alloys—and can be employed in a variety of tempers. Several types of aluminum alloys that may be employed include an aluminum-magnesium alloy, an aluminum-silicon alloy, an aluminum-magnesium-silicon alloy, or an aluminum-zinc alloy, any of which may be coated with zinc or a conversion coating to improve adhesive bond performance, if desired. Some specific aluminum alloys that may be used in the aluminum-based workpiece 14 are AA5754 and AA5182 aluminum-magnesium alloy, AA6111 and AA6022 aluminum-magnesium-silicon alloy, and AA7003 and 7055 aluminum-zinc alloy.

The steel and aluminum-based workpieces 12, 14 are assembled in overlapping fashion for resistance spot welding at a predetermined weld site 16 (FIG. 2) by the weld gun 18. When stacked-up for spot welding, the steel workpiece 12 includes a faying surface 20 and an exterior surface 22. Likewise, the aluminum-based workpiece 14 includes a faying surface 24 and an exterior surface 26. The faying surfaces 20, 24 of the two workpieces 12, 14 overlap and contact one another to provide a faying interface 28 at the weld site 16. The faying interface 28, as used herein, encompasses instances of direct contact between the faying surfaces 20, 24 of the workpieces 12, 14 as well as instances of indirect contact in which the faying surfaces 20, 24 are not touching but are in close enough proximity to each another—such as when a thin layer of adhesive, sealer, or some other intermediate material is present—that resistance spot welding can still be practiced. The exterior surfaces 22, 26 of the steel and aluminum alloy workpieces 12, 14, on the other hand, generally face away from each other in opposite directions. Each of the steel and aluminum-based workpieces 12, 14 preferably has a thickness 120, 140 that ranges from about 0.3 mm to about 6.0 mm, and more preferably from about 0.5 mm to about 3.0 mm, at least at the weld site 16. The thicknesses 120, 140 of the workpieces 12, 14 can be the same, but do not have to be.

The weld gun 18 is shown schematically in FIG. 1 and is one part of a larger automated welding operation within a manufacturing setting. The weld gun 18, for example, may be mounted on a robot positioned in the vicinity of a conveyor or other transport device that is set up to deliver the workpiece stack-up 10 (as well as others like it and others unlike it) to the weld gun 18. The robot may be constructed to move the weld gun 18 along the workpiece stack-up 10, once delivered, so that a rapid succession of spot welds can be formed at many different weld sites 16. The weld gun 18 may also be a stationary pedestal-type weld gun in which the workpiece stack-up 10 is manipulated and moved relative to the weld gun 18 to enable the formation of multiple spot welds at different weld sites 16 around the stack-up 10. The weld gun 18 is, of course, meant to represent other types and arrangements of weld guns not specifically mentioned or described here so long as they are capable of spot welding the workpiece stack-up 10 according to the prescribed multi-step spot welding method and supplemental cooling method applied to the exterior surface of the aluminum workpiece.

The weld gun 18 includes a first gun arm 30 and a second gun arm 32 that are mechanically and electrically configured to repeatedly form spot welds in accordance with a defined weld schedule. The first gun arm 30 has a first electrode holder 34 that retains a first spot welding electrode 36, and the second gun arm 32 has a second electrode holder 38 that retains a second spot welding electrode 40. The first and second spot welding electrodes 36, 40 are each preferably formed from an electrically conductive material such as copper alloy. One specific example is a zirconium copper alloy (ZrCu) that contains about 0.10 wt. % to about 0.20 wt. % zirconium and the balance copper. Copper alloys that meet this constituent composition and are designated C15000 are preferred. Other copper alloy compositions that possess suitable mechanical and electrical conductive properties may also be employed.

The first spot welding electrode 36 includes a first weld face 42 and the second spot welding electrode 40 includes a second weld face 44. The weld faces 42, 44 of the first and second spot welding electrodes 36, 40 are the portions of the electrodes 36, 40 that are pressed against, and impressed into, opposite sides of the workpiece stack-up 10 during a spot welding event, which, here, are the exterior surfaces 22, 26 of the workpieces 12, 14. A broad range of electrode weld face designs may be implemented for each spot welding electrode 36, 40. Each of the weld faces 42, 44 may be flat or domed, and may further include surface features (e.g., surface roughness, ringed features, a plateau, etc.) as described, for example, in U.S. Pat. Nos. 6,861,609, 8,222, 560, 8,274,010, 8,436,269, and 8,525,066, and U.S. Pat. Pub. No. 2009/0255908. A mechanism for cooling the electrodes 36, 40 with water is also typically incorporated into the gun arms 30, 32 and the electrode holders 34, 38 to manage the temperatures of the spot welding electrodes 36, 40.

The first and second spot welding electrodes 36, 40 can share the same general configuration or a different one. For instance, the weld face 42, 44 of each spot welding electrode 36, 40 may have a diameter between 5 mm and 20 mm, or more narrowly between 8 mm and 12 mm, and a radius of curvature between 5 mm and flat, or more narrowly between 20 mm and 50 mm. Each weld face 42, 44 may further include a series of radially-spaced ringed ridges that project outwardly from a base surface of the weld face 42, 44. Such an electrode weld face design has is quite useful when pressed into contact against an aluminum-based workpiece since the ringed ridges function to stretch and breakdown the surface oxide layer(s) on the aluminum-based workpiece to establish better electrical and mechanical contact at the electrode/workpiece junction. The same electrode weld face design is also able to function effectively when pressed into contact against a steel workpiece primarily due to the radius of curvature. The ringed ridges have very little effect on the commutation of current through a steel workpiece and, in fact, are quickly deformed by the stresses associated with being pressed against a steel workpiece during spot welding. In other embodiments, conventional steel and aluminum-based spot welding electrodes known to skilled artisans may be used as the first and second spot welding electrodes 36, 40, respectively, including ball-nose, domed, and flat spot welding electrodes.

The welding gun arms 30, 32 are operable during spot welding to press the weld faces 42, 44 of the spot welding electrodes 36, 40 against opposite sides of the workpiece stack-up 10. Here, as shown in FIGS. 1-2, the opposite sides of the workpiece stack-up 10 are the oppositely-facing exterior surfaces 22, 26 of the overlapping steel and aluminum-based workpieces 12, 14. In this illustrated embodiment, for example, the first and second gun arms 30, 32 have approximately orthogonal longitudinal axes, and the first gun arm 30 is moveable along its longitudinal axis towards the second gun arm 32 by an actuator 46 such as an air cylinder or a servo motor. An actuator control 48 may cause compressed air to be delivered to the actuator 46, if the actuator 46 is an air cylinder, or it may cause current/voltage to be delivered to the actuator 46, if the actuator 46 is a servo motor, to move the first gun arm 30 as intended to press the weld faces 42, 44 against opposite sides of the workpiece stack-up 10 (surfaces 22, 26) and to apply the desired clamping force. The first and second weld faces 42, 44 are typically pressed against their respective exterior surfaces 22, 26 in diametric alignment with one another at the weld site 16.

The weld gun 18 is also configured to pass electrical current between the first and second spot welding electrodes 36, 40—and through the workpiece stack-up 10 at the weld site 16—when the weld faces 42, 44 of the electrodes 36, 40 are pressed against the opposite sides of the stack-up 10. Electrical current can be delivered to the weld gun 18 from a controllable power supply 50. The power supply 50 is preferably a medium-frequency DC (MFDC) power supply that electrically communicates with the spot welding electrodes 36, 40. A MFDC power supply generally includes a transformer and a rectifier. The transformer "steps down" an input AC voltage—usually about 1000 Hz—to generate a lower-voltage, higher-amperage AC current which is then fed to the rectifier where a collection of semiconductor diodes converts the supplied AC current into a DC current. Such a power supply component is commercially available from a number of suppliers including ARO Welding Technologies (US headquarters in Chesterfield Township, Mich.) and Bosch Rexroth (US headquarters in Charlotte, N.C.).

The power supply 50 is controlled by a weld controller 52 in accordance with a programmed weld schedule. The weld controller 52, which cooperates with the actuator control 48 (by means not shown), interfaces with the power supply 50 and sets the applied current level, duration, and current type (constant, pulsed, etc.) of electrical current being passed between the spot welding electrodes 36, 40 in order to carry out the multi-stage spot welding method. Specifically, the weld controller 52 instructs the power supply 50 to deliver electrical current such that the various stages of weld joint development called for in the multi-stage spot welding method are accomplished. The stages of the multi-stage spot welding method, as mentioned above, include (1) the molten weld pool growth stage, (2) the molten weld pool solidification stage, (3) the weld nugget re-melting stage, (4) the re-melted weld nugget solidification stage, and optionally (5) the metal expulsion stage, each of which will be explained in more detail below.

Figure 3:
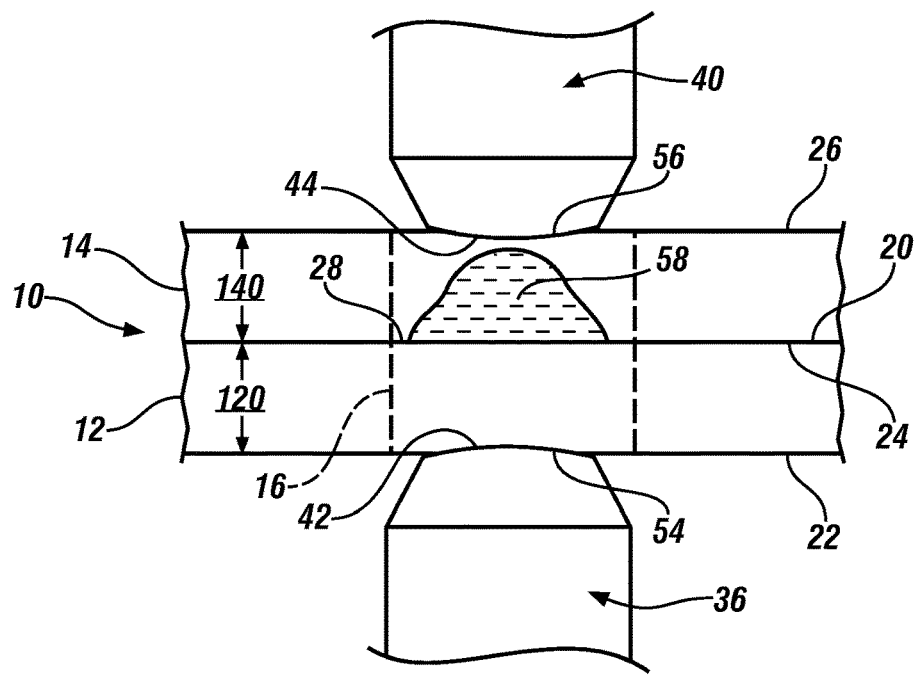
FIG. 3 is a partial cross-sectional view of the workpiece stack-up during part of the multi-stage welding method in which a molten weld pool has been initiated and grown within the aluminum-based workpiece.

Referring now to FIGS. 3-7, the multi-stage spot welding method, including its various stages of weld joint development and the external cooling of the aluminum workpiece, is illustrated in general schematic fashion. To begin, the workpiece stack-up 10 is located between the first and second spot welding electrodes 36, 40 so that the generally round weld site 16 is generally diametrically aligned with the opposed weld faces 42, 44. The workpiece stack-up 10 may be brought to such a location, as is often the case when the gun arms 30, 32 (FIG. 1) are part of a stationary pedestal welder, or the gun arms 30, 32 may be robotically moved to locate the electrodes 36, 40 relative to the weld site 16. Once the stack-up 10 is properly located, the first and second gun arms 30, 32 converge relative to one another to contact and press the weld faces 42, 44 of the first and second welding electrodes 36, 40 against opposite sides of the stack-up 10 at the weld site 16, which, in this embodiment, are the oppositely-facing exterior surfaces 22, 26 of the steel and aluminum-based workpieces 12, 14, as shown in FIG. 3. Upon making contact with the workpiece stack-up 10 under pressure, the first and second weld faces 42, 44 impress into their respective opposite side surfaces of the stack-up 10. The resultant indentations originated by the opposed weld faces 42, 44 are referred to here as a first contact patch 54 and a second contact patch 56.

The molten weld pool growth stage is commenced once the spot welding electrodes 36, 40 are pressed against the workpiece stack-up 10 at the weld site 16. During the molten weld pool growth stage, a molten weld pool 58 is initiated and grown within the aluminum-based workpiece 14, as schematically depicted in FIG. 3. The molten weld pool 58 extends from the faying interface 28 of the workpieces 12, 14 into the aluminum-based workpiece 14. And it is composed predominantly of molten aluminum-based material from the aluminum-based workpiece 14 since the steel workpiece 12 is heated at the weld site 16 to a relatively high temperature, but typically does not melt. The molten weld pool 58 may penetrate a distance into the aluminum-based workpiece 14 that ranges from 20% to 100% (i.e., all the way through the aluminum-based workpiece 14) of the thickness 140 of the aluminum-based workpiece 14 at the weld site 16. The thickness 140 of the aluminum-based workpiece 14 at the weld site 16 is typically less than the thickness outside of the weld site 16 due to the indentation of the second contact patch 56 on the workpiece stack-up 10. The portion of the molten weld pool 58 adjacent to the faying interface 28, consequently, wets the faying surface 20 of the steel workpiece 12.

The molten weld pool 58 is initiated and grown by passing electrical current between the spot welding electrodes 36, 40 and through the workpieces 12, 14 and across their faying interface 28 for a first period of time. Resistance to the flow of the electrical current through the workpieces 12, 14 and across the faying interface 28 generates heat and initially heats up the steel workpiece 12 more quickly than the aluminum-based workpiece 14. The generated heat quickly (within milliseconds) initiates the molten weld pool 58 and then continues to grow the molten weld pool 58 to its desired size. Indeed, at the beginning of electrical current flow when the second contact patch 56 is smallest in area and current density is highest, the molten weld pool 58 initiates quickly and rapidly grows and penetrates into the aluminum-based workpiece 14. As the second contact patch 56 formed by the weld face 44 of the second welding electrode 40 increases in area over the course of electrical current flow, the electrical current density decreases and the molten weld pool 58 grows more laterally in the vicinity of the faying interface 28.

When carrying out the molten weld pool growth stage, the level of the applied electrical current and the duration of the first period of time depend on several factors. The main factors that influence the electrical current level and duration are the thicknesses 120, 140 of the steel and aluminum-based workpieces 12, 14 at the weld site 16 and the exact compositions of the workpieces 12, 14. In some instances, though, the electrical current passed during the weld pool growth stage is a constant direct current (DC) that has a current level between 4 kA and 40 kA and the duration of electrical current flow is between 50 ms and 500 ms. The electrical current, alternatively, may be pulsed, in which over the course of the first period of time, the passing electrical current is a plurality of current pulses. Each of the current pulses may last from 10 ms to 200 ms and have a peak current level between 10 kA and 50 kA, with periods of zero current flow lasting from 1 ms to 100 ms between pulses, preferably between 5 ms to 50 ms. Other current levels and durations of the first period of time may of course be employed and, in fact, skilled artisans will know and understand how to adjust these parameters accordingly in order to satisfy the molten weld pool growth stage.

Figure 4:
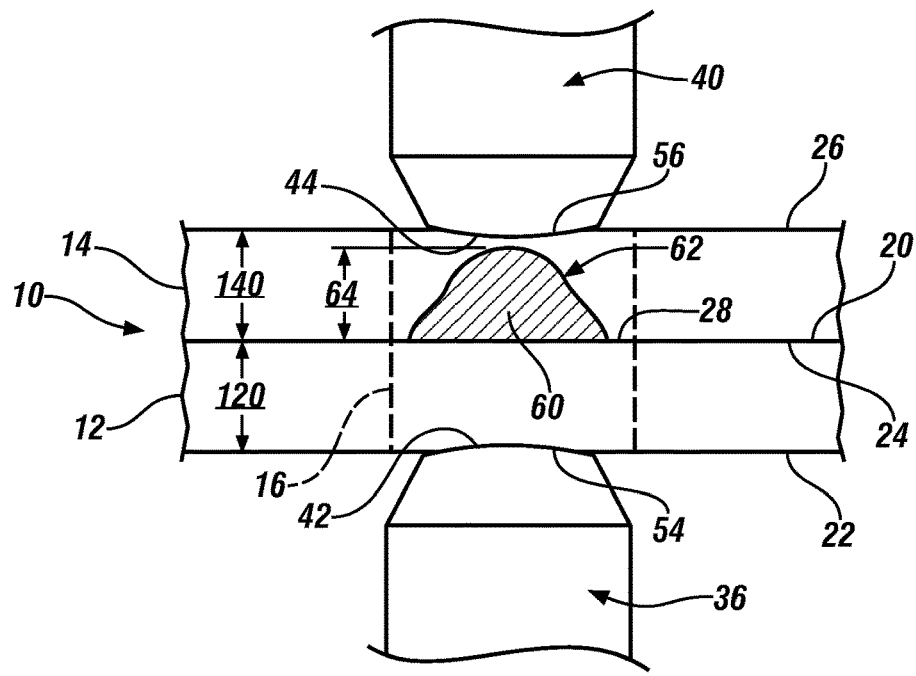
FIG. 4 is a partial cross-sectional view of the workpiece stack-up during part of the multi-stage welding method after the molten weld pool has been allowed to cool and solidify into a weld nugget that forms all or part of a weld joint.

After the molten weld pool has been initiated and grown, the molten weld pool solidification stage is carried out. During the molten weld pool solidification stage, the molten weld pool is allowed to cool and solidify into a weld nugget 60 that forms all or part of a weld joint 62, as illustrated in FIG. 4. In this molten weld pool solidification stage, external cooling of outer surface 26 of aluminum workpiece 14 is usually not required. Cooling and solidification of the molten weld pool 58 can be realized over a second period of time in one of two ways by managing welding electrical current flow. First, passage of electrical current between the first and second spot welding electrodes 36, 40 can be ceased. And second, if ceasing electrical current flow altogether is not desired, electrical current can be passed between the first and second spot welding electrodes 36, 40 at a reduced level that would be unable to maintain the molten state of the weld pool 58, thus allowing the molten weld pool 58 to cool and solidify, albeit at a slower rate than ceasing electrical current flow entirely. Again, like before, the duration of the second period of time and the reduced current level (which allows solidification to happen) may vary depending on the thicknesses 120, 140 of the workpieces 12, 14 at the weld site 16 and the actual compositions of the workpieces 12, 14. Passing an electrical current below 5 kA, or ceasing current, for between 20 ms and 1000 ms, and preferably 50 ms and 250 ms, is usually sufficient to solidify the molten weld pool 58 into the weld nugget 60.

Figure 7:
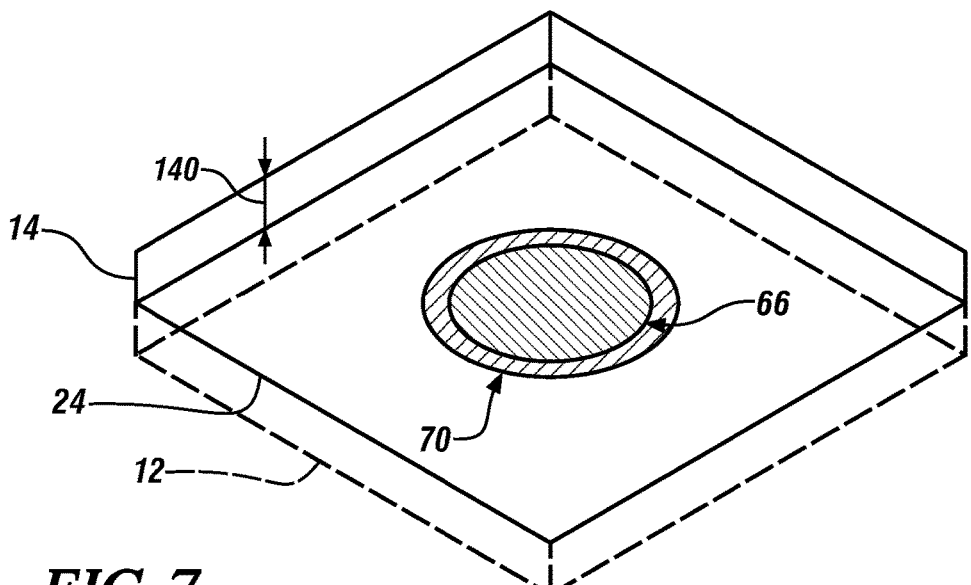
FIG. 7 is a perspective view of the workpiece stack-up, from the bottom, in which the steel workpiece is shown in phantom to schematically illustrate the weld bond area of the weld nugget as well as the possible additional weld bond area that may be attained as a result of re-melting at least a portion of the weld nugget during the multi-stage welding method.

The weld nugget 60 extends a distance from the faying interface 28 into the aluminum-based workpiece 14 to a penetration depth 64. The penetration depth 64 of the weld nugget 60 may range from 20% to 100% (i.e., all the way through the aluminum-based workpiece 14) of the thickness 140 of the aluminum-based workpiece 14 at the weld site 16. The thickness 140 of the aluminum-based workpiece 14 at the weld site 16, as before, is typically less than the thickness outside of the weld site 16 due to the indentation of the second contact patch 56 on the workpiece stack-up 10. Additionally, the weld nugget 60 defines a weld bond area 66, as shown in FIG. 7, which is the surface area of the weld nugget 60 adjacent with and joined to the faying surface 20 of the steel workpiece 12 by way of intervening intermetallic Fe—Al reaction layers. The weld bond area 66, as reported in mm², is preferably at least $4(\pi)(t)$ in which "t" is the thickness 140 of the aluminum-based workpiece 14 in millimeters at the weld site 16 prior to origination of the second contact patch 56. In other words, when calculating the preferred $4(\pi)(t)$ weld bond area, the thickness "t" of the aluminum-based workpiece 14 is the original thickness of the workpiece 14 as measured prior to indentation of the weld face 44 of the second welding electrode 40. The weld bond area 66 can be varied as desired by managing the size of the molten weld pool 58 grown in the molten weld pool growth stage.

The weld nugget 60 may include weld defects dispersed at and along the faying interface 28 within the weld bond area 66. These defects—which can include gas porosity, shrinkage voids, micro-cracking, and surface oxide residue—are believed to be swept towards the faying interface 28 during solidification of the molten weld pool 58 where they have a tendency to weaken the strength of the weld joint 62, in particular the peel strength, as previously explained. The weld joint 62 may also include, in addition to the weld nugget 60, one or more thin reaction layers of Fe—Al intermetallic compounds (not shown) on the steel workpiece 12 and adjacent to the faying interface 28, as previously indicated. These layers are produced mainly as a result of reaction between the molten weld pool 58 and the steel workpiece 12 at spot welding temperatures. The one or more layers of Fe—Al intermetallic compounds may include intermetallics such as $FeAl_3$, $Fe_2Al_5$, as well others, and their combined thickness typically ranges from 1 μm to 10 μm. The hard and brittle nature of the Fe—Al intermetallic compounds is also thought to negatively affect the strength of the overall weld joint 62, especially when the total thickness of the combined intermetallic layer exceeds 10 μm.

Figure 5:
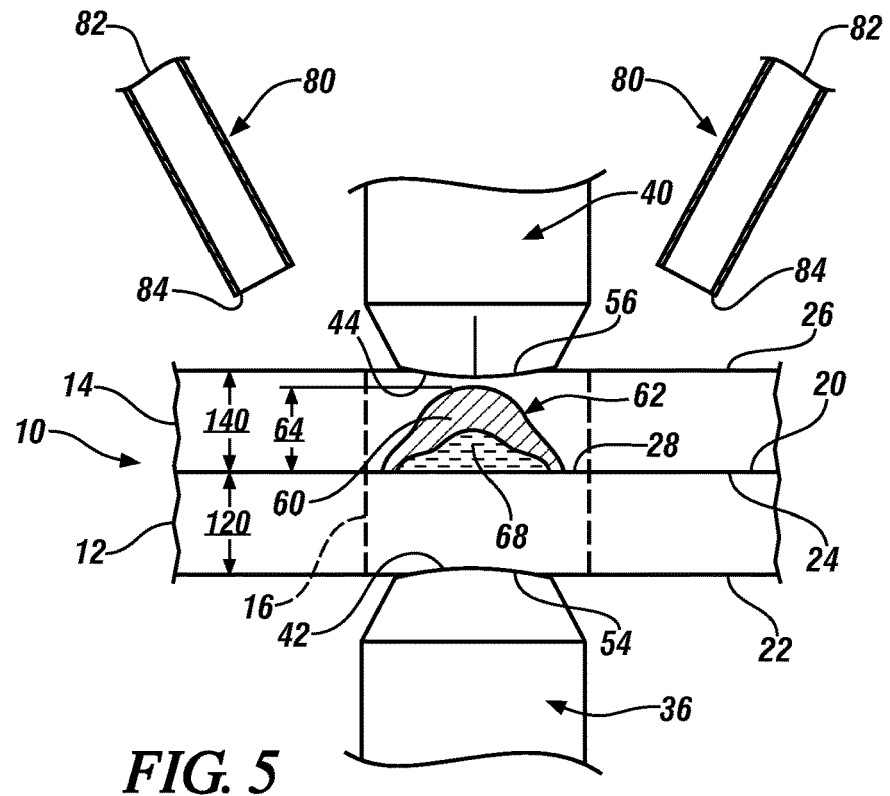
FIG. 5 is a partial cross-sectional view of the workpiece stack-up during part of the multi-stage welding method in which at least a portion of the weld nugget has been re-melted. By this stage of the welding process, a supplemental cooling device is placed or assembled around the resistance welding electrode engaging the outer surface of the aluminum-based workpiece.

After the weld joint 62 has been established, the weld nugget re-melting stage is performed. During the weld nugget re-melting stage, at least a portion 68 of the weld nugget 60 is re-melted, as depicted in FIG. 5. The re-melted portion 68 of the weld nugget 60 preferably includes at least part of the weld bond area 66 that was established during the molten weld pool solidification stage. It also typically does not extend all the way to the penetration depth 64 of the weld nugget 60. The shallower penetration of the re-melted portion 68 occurs because at the time of the weld nugget re-melting stage, the weld face 44 of the second spot welding electrode 40 has indented further into the workpiece stack-up 10, and the second contact patch 56 has correspondingly increased in size, meaning that electrical current is passed between the spot welding electrodes 36, 40 over a broader area, which has the effect of promoting re-melting closer to the faying interface 28 with less penetration into the aluminum-based workpiece 14. The re-melted portion 68 of the weld nugget 60, moreover, may be entirely confined within the weld bond area 66 or it may encompass the entire weld bond area 66 and actually combine with freshly melted material from the aluminum-based workpiece 14 outside of, and adjacent to, the weld bond area 66 to established an enlarged weld bond area 70 (FIG. 7). The area of the enlarged weld bond area 70, if created, may be up to 50% greater than the weld bond area 66 of the weld nugget 60 before re-melting.

The weld nugget 60 is at least partially re-melted by passing electrical current between the spot welding electrodes 36, 40 and through the workpieces 12, 14 for a third period of time following the molten weld pool solidification stage. Passage of electrical current, here, is generally done at a higher level (rms current) than in the molten weld pool growth stage since the weld face 44 of the second spot welding electrode 40 is further impressed into the workpiece stack-up 10 and the faying interface 28 is less liable to generate heat within the weld site 16 since the weld joint 62 is more electrically conductive than the distinct, unjoined faying surfaces 20, 24 of the workpieces 12, 14. Again, the level of the applied electrical current and the duration of the third period of time depend on the thicknesses 120, 140 of the steel and aluminum-based workpieces 12, 14 at the weld site 16 and the exact compositions of the workpieces 12, 14. But, in some instances, the electrical current passed during the weld nugget re-melting stage may be a constant direct current (DC) that has a current level between 10 kA and 50 kA and the duration of electrical current flow may be between 100 ms and 2000 ms. The electrical current can also be pulsed to produce similar rms levels.

The electrical current delivered during the weld nugget re-melting stage is preferably in the form of current pulses that may or may not increase in applied current level over the course of the third period of time. Like before, when pulsed, the passing electrical current is a plurality of current pulses delivered over the third period of time. Each current pulse may last from 10 ms to 200 ms and have a peak current level between, for example, 15 kA and 50 kA, with periods of zero current flow lasting from, for example, 1 ms to 100 ms and preferably 5 ms to 50 ms between pulses. The current pulses can be said to increase in applied current level when at least 75% of the current pulses, and preferably 100%, attain a peak current level that is greater than the peak current level of the immediately preceding current pulse. The use of current pulses may be practiced in the weld nugget re-melting stage for several reasons. Most notably, the use of current pulses helps prevent excessive penetration of the re-melted portion 68 of the weld nugget 60 by keeping the electrode/workpiece cool, which also has the benefit of preserving the operational lifetime of the second welding electrode 40.

The re-melting of the weld nugget 60 is believed to positively impact the strength, including the peel strength, of the ultimately-formed weld joint 62 that is placed into service. Without being bound by theory, it is believed that re-melting the weld nugget 60, especially the weld bond area 66 at the faying interface 28, redistributes and breaks down the various weld defects, i.e., porosity, cracks, and oxide residue, that get driven to and along the faying interface 28 during solidification of the molten weld pool 58, thus improving the ability of the weld nugget 60 to bond with the faying surface 20 of the steel workpiece 12. The creation of the re-melted portion 68, for example, is thought to consolidate entrained gas porosity near the center of the weld nugget 62, and possibly evolve some gas from the re-melted portion 68, while thermal expansion and contraction of the weld nugget 60 during re-melting is thought to break up and disperse residual oxides and micro-cracks that may be present at the weld bond area 66 or in the vicinity.

Figure 6A:
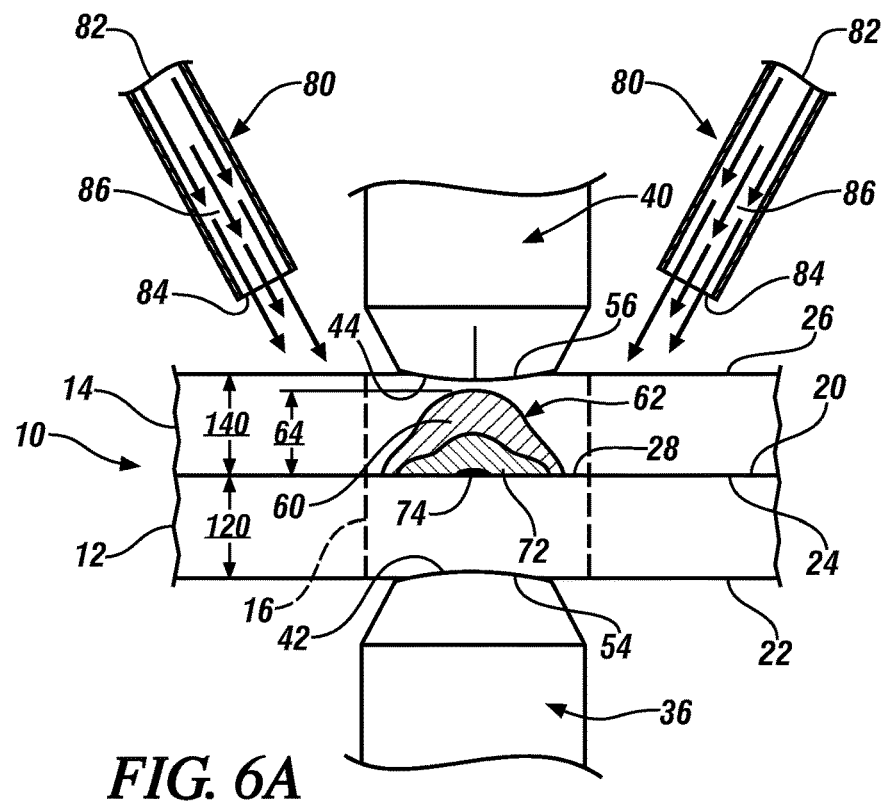
FIG. 6A is a partial cross-sectional view of the workpiece stack-up as the top surface of the aluminum-based workpiece at the weld site region is cooled with the flow of a chilled gas from supported tubes placed around the welding electrode. The flow of chilled gas enhances the re-solidification of the re-melted portion of the initial weld nugget so as to confine impurities in a smaller region of the interface of the weld nugget with the steel surface.
Figure 6B:
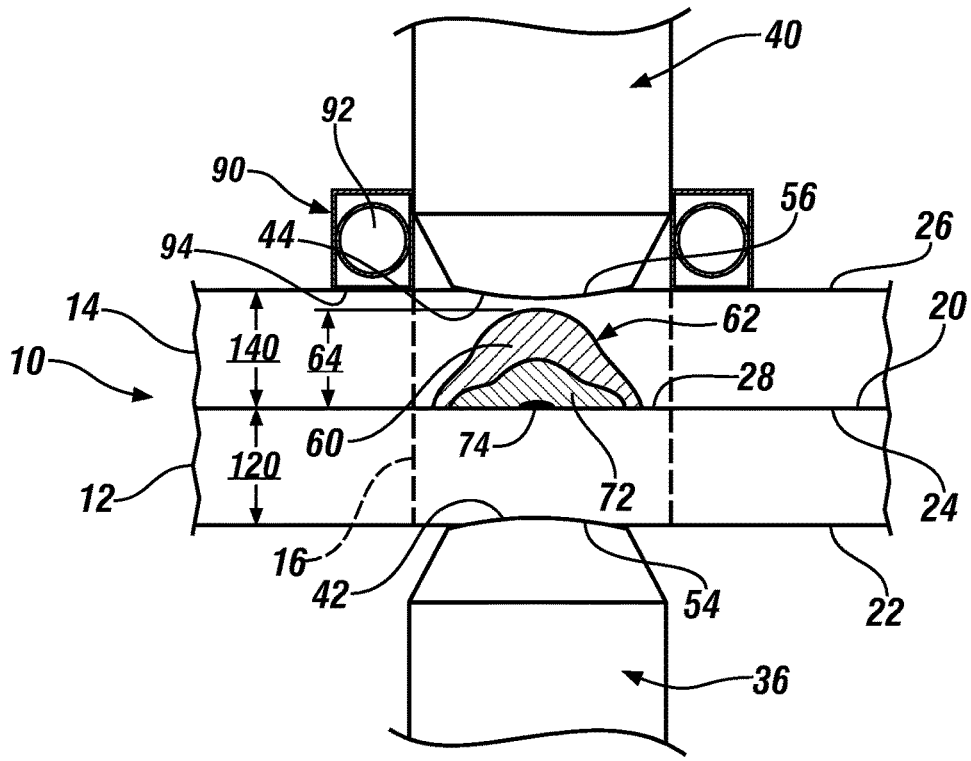
FIG. 6B is a partial cross-sectional view of the workpiece stack-up as the weld site region at the top surface of the aluminum-based workpiece is being cooled using a heat exchanger placed around the welding electrode. The supplemental cooling provided by the heat exchanger enhances the re-solidification of the re-melted portion of the initial weld nugget.

Following the weld nugget re-melting stage, the re-melted weld nugget solidification stage is performed. It is in this weld nugget resolidification state that supplemental cooling is performed at the outer surface of the aluminum-based workpiece at and around the spot weld site. Apparatus and practices for the supplemental cooling are schematically illustrated in FIGS. 5, 6A, and 6B. This supplemental cooling is used just after (or even just before) the flow of weld current is stopped in accordance with a resistance spot weld current flow program. The pressure of the spot welding electrodes is maintained, and if the spot welding electrodes are water cooled, their cooling effect on the workpieces is also utilized.

During the re-melted weld pool solidification stage, the re-melted portion 68 of the weld nugget 60 (as well as any newly melted material of the aluminum-based workpiece 14 outside of the original weld bond area 66) is allowed to cool and solidify, as shown in FIG. 6A, preferably with the faces 42, 44 of the first and second spot welding electrodes 36, 40 still pressed in contact patches 54, 56 against the workpiece stack-up 10. The re-solidified portion 72 of the weld nugget 60, which is derived from re-melted portion 68, is depicted here as a distinct part of the weld nugget 60 although, in actual practice, the re-solidified portion 72 may not be easily distinguishable from the part(s) of the weld nugget 60 (if any) that do not undergo re-melting and re-solidification. And, as alluded to above, the re-solidified portion 72 of the weld nugget 60 is believed to contain less weld defects at or near the faying interface 28 than would otherwise be present due to the combination of the weld nugget re-melting stage and the application of the supplemental cooling as will be described with reference to FIGS. 5, 6A, and 6B.

Prior to or during the activation of the first and second spot welding electrodes 36, 40 a set of tubes 80 for the delivery of chilled air are positioned in a circular pattern around welding electrode 40 which is still pressed against the upper surface 26 of aluminum-based workpiece 14 at weld site 16. Two such tubes 80 are illustrated in FIGS. 5 and 6A. Each tube has an upper inlet end 82 for receiving a flow of cooling air, nitrogen, or other selected gas for the cooling of surface 26 of aluminum-based workpiece. And each tube has a lower outlet end 84 for directing and delivering the cooling gas stream against surface 26 in a circular area surrounding weld site 16. As illustrated, tubes 80 may be supported in a slanted position so as to direct the chilled gas in the surface area of the aluminum-based workpiece 14 to be cooled. For example, a group of gas delivery tubes 80 (e.g., three or four tubes) may be supported on a semi-circular bracket or frame (not illustrated) and a pair of such multi-tube chilled-air delivery assemblies placed in a circular arrangement around resistance welding electrode 40 with the outlet ends 84 of tubes 80 directed to deliver cooling gas against surface 26 of aluminum-based workpiece 14. This arrangement of supported cooling tubes, or other cooling device, may be placed around resistance welding electrode 40 at the beginning of the welding program when the resistance welding electrodes 36, 40 are initially pressed against surfaces 54, 56 of the workpieces 12, 14. But the cooling device should be in position around welding electrode 40 no later than during a final step of liquid weld pool formation 68 as illustrated in FIG. 5. Other gas flow cooling devices are possible, such as a circular tube or manifold that surrounds the electrode body and directs cooling gas through orifices towards surface 26 of the aluminum-based workpiece 14.

In this cooling embodiment, utilizing tubes 80 for delivery of cooling air or other gas, as illustrated in FIGS. 5 and 6A, a suitable source of the cooling gas or fluid is provided (not illustrated) with gas delivery routes provided to deliver the coolant to a manifold or other device to direct the cooling gas into the inlets 82 of each of the tubes 80. With the completion of liquid weld nugget formation (for example, liquid nugget 68 in FIG. 5) in the spot weld program, rapid and effective re-solidification of the small weld liquid pool 68 is to be accomplished.

Weld current flow in electrodes 36, 40 is stopped, and if they are, for example, water cooled, the resistance spot welding electrodes contribute to the cooling of the liquid weld nugget. And the ambient air contributes to the re-solidification process. But in this embodiment of the subject method, a controlled volume of cooling gas or fluid, which may be cooled below ambient temperatures, is delivered in a stream 86 from the outlets 84 of tubes 80 at a predetermined temperature or temperature range, and is directed, as illustrated in FIG. 6A, against the portion of aluminum workpiece outer surface 26 surrounding the contact patch 56 contacted by face 44 of welding electrode 40. The volume flow rate of this cooling gas must be sufficient to modify the direction of solidification of the weld pool and preferably is greater than 10 cm$^3$/s and more preferably greater than 50 cm$^3$/s. By trial or experience a suitable volume flow rate for the cooling gas will be attained, and further increases in the flow rate will not significantly improve the properties of the spot weld.

This cooling process is managed to direct the progressive solidification front in liquid nugget 68 (FIG. 5) so that impurities (refractory Al-containing oxides, intermetallic Al—Fe compounds, and the like) in the melt are confined radially inwardly and downwardly at surface 24 of weld site 16. A goal of the cooling process is to confine such impurities centrally, lying against the faying steel workpiece surface 28 in a relatively small area 74 of the solidified nugget 72 (FIG. 6A). The stream 86 of cooled gas is used to more rapidly increase the solidification of liquid nugget in a direction radially inwardly along the steel faying surface while maintaining the downwardly solidification from the aluminum surface 26 toward the steel faying surface 28 at the same rate. This enhanced solidification in the radial direction will drive impurities and defects towards the center (e.g., area 74) of the weld nugget 72.

A different circular cooling device 90 for producing a refined solidified weld nugget 74 is illustrated in FIG. 6B. In cooling device 90 a liquid or gaseous cooling material is contained and circulated in a thermally conductive metal tube 92 which in turn is in good heat transfer contact with shaped container surface 94. Container surface 94 is shaped with abundant heat transfer surface for placement around (but not touching) resistance welding electrode 40 and against outer surface 26 of aluminum workpiece 14. Coolant may be delivered to and from device 90. And cooling device 90 is operated to refine the solidification of liquid weld nugget 68 as described above using the chilled gas delivery system.

After the multi-stage spot welding method has resulted in the formation of the weld joint 62, including the weld nugget 60 having the re-solidified portion 72, the first and second spot welding electrodes 36, 40 are retracted from their respective contact patches 54, 56. The workpiece stack-up 10 and associated cooling system (e.g., tubes 80, device 90) is then successively located relative to the weld gun 18 at other weld sites 16, and the multi-stage spot welding process is repeated at those sites 16, or the workpiece stack-up 10 is moved away from the weld gun 18 to make way for another stack-up. The above-described multi-stage spot welding method can thus be carried out many times at different weld sites on the same workpiece stack-up as well as different workpiece stack-ups in a manufacturing setting to successfully, consistently, and reliably form weld joints between a steel workpiece and an aluminum-based workpiece.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in this specification.

The invention claimed is:

1. A method of resistance spot welding comprising:
providing a workpiece stack-up that comprises an aluminum-based workpiece and a steel workpiece, the aluminum-based workpiece having a faying surface and the steel workpiece having a faying surface, the faying surfaces of the aluminum-based workpiece and the steel workpiece overlapping and contacting to provide a faying interface between the workpieces, the aluminum-based workpiece and the steel workpiece each further having an opposed side surface;
contacting the opposed side surface of the aluminum-based workpiece with a spot welding electrode and contacting the opposed side surface of the steel workpiece with another spot welding electrode such that the spot welding electrodes are aligned at a spot weld site;
controlling a passage of electrical current between the spot welding electrodes and through the aluminum-based workpiece and the steel workpiece to grow a molten weld pool in the aluminum-based workpiece that extends from the faying interface into the aluminum-based workpiece; and
cooling the aluminum-based workpiece externally around the spot welding electrode in contact with the opposed side surface of the aluminum-based workpiece to drive solidification of the molten weld pool radially inwardly and to produce a weld nugget that includes a weld bond area joined to the faying surface of the steel workpiece, the cooling being controlled to reduce residual stress in the aluminum-based workpiece at the spot weld site.

2. The method as set forth in claim 1, wherein a round molten weld pool is formed in the aluminum-based workpiece, the molten weld pool having a radius dimension and a perimeter dimension at the faying interface and decreasing radii dimensions and perimeter dimensions as the molten weld pool extends into the aluminum-based workpiece, and the cooling of the aluminum-based workpiece externally around the molten weld pool causing displacement of solid material other than the aluminum-based composition toward a center portion of the weld nugget.

3. The method as set forth in claim 1, wherein a stream of a cooling gas is directed at the opposed side surface of the aluminum-based workpiece surrounding an area of the aluminum-based workpiece contacted by the spot welding electrode.

4. The method as set forth in claim 1, wherein a surface of a heat exchanger is placed in contact with the opposed side surface of the aluminum-based workpiece surrounding an area of the aluminum-based workpiece contacted by the spot welding electrode.

5. The method as set forth in claim 3, wherein the stream of cooling gas is at a temperature of 15° C. to 0° C. as the stream of cooling gas flows against the opposed side surface of the aluminum-based workpiece.

6. The method as set forth in claim 3, wherein a flow rate of the stream of cooling gas is greater than 10 cm$^3$/s.

7. The method as set forth in claim 4, wherein the surface of the heat exchanger is at a temperature of 15° C. to 0° C.

8. The method as set forth in claim 4, wherein the heat exchanger is a thermally conductive metal tube through which a liquid or gaseous cooling fluid is circulated.

9. The method as set forth in claim 6, wherein the flow rate of the stream of cooling gas is greater than 50 cm$^3$/s.

10. A method of resistance spot welding comprising:
providing a workpiece stack-up that comprises an aluminum-based workpiece and a steel workpiece, the aluminum-based workpiece having a faying surface and the steel workpiece having a faying surface, the faying surfaces of the aluminum-based workpiece and the steel workpiece overlapping and contacting to provide a faying interface between the workpieces, the aluminum-based workpiece and the steel workpiece each further having an opposed side surface;
contacting the opposed side surface of the aluminum-based workpiece with a spot welding electrode and contacting the opposed side surface of the steel workpiece with another spot welding electrode such that the spot welding electrodes are aligned at a spot weld site;
controlling a passage of electrical current between the spot welding electrodes and through the aluminum-based workpiece and the steel workpiece to (1) grow a molten weld pool in the aluminum-based workpiece that extends from the faying interface into the aluminum-based workpiece, (2) solidify the molten weld pool into a weld nugget, (3) remelt at least a portion of the weld nugget, and (4) resolidify the remelted portion of the weld nugget; and,
cooling the aluminum-based workpiece externally around the spot welding electrode in contact with the opposed side surface of the aluminum-based workpiece as the remelted portion of the weld nugget resolidifies.

11. The method as set forth in claim 10, wherein a round molten weld pool is formed in the aluminum-based workpiece, the molten weld pool having a radius dimension and a perimeter dimension at the faying interface and decreasing radii dimensions and perimeter dimensions as the molten weld pool extends into the aluminum-based workpiece.

12. The method as set forth in claim 10, wherein a stream of a cooling gas is directed at the opposed side surface of the aluminum-based workpiece surrounding an area of the aluminum-based workpiece contacted by the spot welding electrode.

13. The method as set forth in claim 10, wherein a surface of a heat exchanger is placed in contact with the opposed side surface of the aluminum-based workpiece surrounding an area of the aluminum-based workpiece contacted by the spot welding electrode.

14. The method as set forth in claim 12, wherein the stream of cooling gas is at a temperature of 15° C. to 0° C. as the stream of cooling gas flows against the opposed side surface of the aluminum-based workpiece.

15. The method as set forth in claim 12, wherein a flow rate of the stream of cooling gas is greater than 10cm$^3$/s.

16. The method as set forth in claim 15, wherein the flow rate of the stream of cooling gas is greater than 50cm$^3$/s.

17. The method as set forth in claim 13, wherein the surface of the heat exchanger is at a temperature of 15° C. to 0° C.

18. The method as set forth in claim 13, wherein the heat exchanger is a thermally conductive metal tube through which a liquid or gaseous cooling fluid is circulated.

* * * * *